United States Patent [19]
Hoogteijling et al.

[11] Patent Number: 6,079,492
[45] Date of Patent: Jun. 27, 2000

[54] METHODS OF RAPIDLY CONSOLIDATING PARTICULATE MATERIALS IN WELLS

[75] Inventors: Morice Hoogteijling, Leiden; Diederik van Batenburg, Delft, both of Netherlands

[73] Assignee: Halliburton Energy Services, Inc., Duncan, Okla.

[21] Appl. No.: 09/168,048

[22] Filed: Oct. 7, 1998

[30] Foreign Application Priority Data

Feb. 2, 1998 [EP] European Pat. Off. .............. 98300774

[51] Int. Cl.$^7$ ..................................... E21B 43/04
[52] U.S. Cl. ........................... 166/276; 166/285
[58] Field of Search .................... 166/276, 278, 166/279, 280, 285, 281

[56] References Cited

U.S. PATENT DOCUMENTS

| | | | |
|---|---|---|---|
| 4,042,032 | 8/1977 | Anderson et al. | 166/276 |
| 4,070,865 | 1/1978 | McLaughlin | 61/36 |
| 4,074,760 | 2/1978 | Copeland et al. | 166/276 |
| 4,199,484 | 4/1980 | Murphey | 260/13 |
| 4,829,100 | 5/1989 | Murphey et al. | 523/131 |
| 5,058,676 | 10/1991 | Fitzpatrick et al. | 166/278 |
| 5,128,390 | 7/1992 | Murphey et al. | 523/130 |

OTHER PUBLICATIONS

SPE Paper No. 27382 entitled entitled "Proppant Back Production During Hydraulic Fracturing: *A New Failure Mechanism for Resin–Coated Proppants*" by R–J. Vreeburg, L.P. Roodhart, and D.R. Davies, Shell Research B.V., and G.S. Penny, STIM–LAB, Inc., presented at the SPE International Symposium on Formation Damage Control held in Lafayette, Louisiana, Feb. 7–10, 1994.

SPE Paper No. 30096 entitled "*Factors Affecting Proppant Flowback with Resin Coated Proppants*" by S.W. Almond, G.S. Penny and M.W. Conway, STIM–LAB, Inc., presented at the European Formation Damage Conference held in The Hague, The Netherlands, May 15–16, 1995.

Article entitled "*Compatibility of Resin–Coated Proppants with Crosslinked Fracturing Fluids*" by K.H. Nimerick, S.B. McConnell, and M.L. Samuelson published in the SPE Production Engineering, Feb. 1992, pp 29–33.

Article entitled "Application of Curable Resin–Coated Proppants" by L.R. Norman, J.M. Terracina, M.A. McCabe, and P.D. Nguyen published in SPE Production Engineering, Nov. 1992, pp 343–349.

*Primary Examiner*—Frank Tsay
*Attorney, Agent, or Firm*—Robert A. Kent

[57] ABSTRACT

The present invention provides improved methods of consolidating particulate material in a subterranean zone penetrated by a well bore. The methods basically comprise the steps of coating the particulate material with a hardenable resin composition and irradiating the hardenable resin composition coating on the particulate material with microwaves to thereby accelerate the hardening of the resin composition whereby the particulate material is rapidly consolidated into a stationary permeable mass.

27 Claims, No Drawings

METHODS OF RAPIDLY CONSOLIDATING PARTICULATE MATERIALS IN WELLS

BACKGROUND OF THE INVENTION

1. Field of the Invention

The present invention relates generally to methods of rapidly consolidating particulate materials in wells such as incompetent formation sands, proppant materials and gravel packing materials.

2. Description of the Prior Art

Oil and gas wells are often completed in subterranean producing zones containing loose and incompetent sands. Heretofore, such loose and incompetent sands have been consolidated into stationary permeable masses by injecting a hardenable resin composition into the producing zones. That is, the incompetent sands in the producing zones are coated with the hardenable resin composition and then the resin composition is caused to harden whereby the sands are consolidated into permeable masses.

The producing zones in oil and gas wells are also often stimulated by hydraulic fracturing. In a hydraulic fracturing procedure, a gelled fracturing fluid is pumped into the zone to be fractured at a rate and pressure such that one or more fractures are formed and extended in the zone. A solid particulate proppant material, e.g., sand, for propping the fractures open is suspended in a portion of the fracturing fluid so that the proppant material is deposited in the fractures. In some instances, all or a part of the proppant material has heretofore been coated with a hardenable resin composition. The resin composition has been caused to harden after the proppant material has been placed in the fractures so that the proppant material is consolidated into a stationary permeable mass. Such consolidation prevents proppant flow-back with fluids produced from the fractured formation.

In gravel packing operations, solid gravel particles such as sand are carried to a subterranean zone or formation in which a gravel pack is to be placed in a gelled carrier fluid. The gravel pack is typically formed between a screen and the walls of a well bore or the inside surfaces of casing cemented in the well bore. The gravel making up the gravel pack is often coated with a hardenable resin composition which is caused to harden whereby the sand is consolidated into a stationary permeable mass. Alternatively, the gravel packing operation may be performed as a high-rate water pack. In this instance, the carrier fluid comprises water or lightly gelled water injected at a high rate into the subterranean formation. Transport of the gravel contained in the fluid is achieved by the high fluid flow rate rather than through use of a gelling agent.

In all of the above described well treatments, the hardenable resin compositions utilized are caused to harden by formation heating or by contacting the resin with an internal or external hardening agent. While the particulate materials used have been successfully consolidated into stationary permeable masses, the hardening processes have taken time during which the wells have had to remain shut-in. The shut-in time required often exceeds a day. This shut-in time delays the start of production and therefore involves a considerable cost in the form of lost production. Thus, there is a need for improved methods of consolidating particulate material in wells whereby the consolidation process rapidly takes place.

SUMMARY OF THE INVENTION

The present invention provides improved methods of rapidly consolidating particulate materials in wells which meet the need described above and overcome the deficiencies of the prior art. The methods of the invention are basically comprised of the steps of coating a particulate material in or to be deposited in a subterranean zone penetrated by a well bore with a hardenable resin composition, and then irradiating the hardenable resin composition coating with microwaves to thereby accelerate the hardening of the resin composition and cause the rapid consolidation of the particulate material into a stationary permeable mass. The irradiation of the hardenable resin composition with microwaves is accomplished by positioning a source of microwaves in the subterranean zone containing the resin coated particulate material and then causing microwaves to radiate from the source.

Improved methods of fracturing a subterranean zone penetrated by a well bore are also provided by the present invention which are basically comprised of the following steps. A gelled fracturing fluid is pumped by way of the well bore into the subterranean zone at a rate and pressure sufficient to fracture the zone. A particulate proppant material coated with a hardenable resin composition which is suspended in the gelled fracturing fluid is carried into the fracture or fractures formed in the zone. Thereafter, the gelled fracturing fluid as well as the hardenable resin composition coating on the proppant material are irradiated with microwaves which causes the acceleration of the breaking of the gelled fracturing fluid whereby it reverts to a thin fluid and the hardening of the resin composition coating whereby the particulate proppant material is consolidated into a stationary permeable mass. The reversion of the gelled fracturing fluid to a thin fluid and the hardening of the resin composition coating takes place rapidly and the well can be placed on production immediately thereafter.

Improved methods of forming a gravel pack in a subterranean zone penetrated by a well bore are also provided by this invention. The methods basically comprise pumping a carrying fluid having a particulate material coated with a hardenable resin composition suspended therein into the subterranean zone whereby the resin composition coated particulate material is deposited between a sand screen and the walls of the well bore in the zone. The hardenable resin composition coating on the particulate material is irradiated with microwaves to thereby cause the acceleration of the hardening of the resin composition coating whereby the particulate material is rapidly consolidated into a permeable mass. Thereafter, fluids are produced from the subterranean zone.

It is, therefore, a general object of the present invention to provide methods of rapidly consolidating resin coated particulate materials in wells.

A further object of the present invention is the provision of improved methods of fracturing subterranean zones or forming gravel packs in subterranean zones whereby the hardening of a resin composition coating on the particulate proppant material or gravel used takes place very rapidly.

Other and further objects, features and advantages of the present invention will be readily apparent to those skilled in the art upon a reading of the description of preferred embodiments which follows.

DESCRIPTION OF PREFERRED EMBODIMENTS

The consolidation of loose and incompetent sands in subterranean zones, the creation and propping of fractures in subterranean zones and the formation of gravel packs in subterranean zones are treatments well known to those skilled in the art. In all of such well treatments, a hardenable resin composition is often coated onto the particulate material involved which is caused to harden.

In one method of consolidating loose and incompetent sands in a subterranean zone, the sands are coated with a hardenable resin composition by injecting the composition into the zone. Thereafter, the resin composition is caused to harden by formation heating or a hardening agent whereby the sands are consolidated into a stationary permeable mass.

In fracturing subterranean zones to stimulate the production of hydrocarbons therefrom, a particulate proppant material, which is typically graded sand, may be coated with a hardenable resin composition and suspended in a fracturing fluid. The fracturing fluid is then pumped into the zone at a rate and pressure which produces one or more fractures therein. The fracturing fluid carries the resin coated proppant material into the formed fractures, and the resin coating on the proppant material is caused to harden whereby the proppant material is consolidated into a stationary permeable mass. The consolidation of the proppant material prevents its flow-back with fluids subsequently produced from the formation.

In the formation of gravel packs, the gravel, which is also typically sand, may be coated with a hardenable resin composition and placed between a sand screen and the walls of a well bore by a gelled carrier fluid or by water injected at a high rate. The resin composition is then caused to harden whereby the gravel pack is consolidated into a stationary permeable mass.

As mentioned above, in all of the above described well treatments, the hardenable resin composition is caused to harden in the subterranean zone by formation heating or by contact of the resin with a hardening agent, either a delayed internal hardening agent or an external hardening agent. However, in all of the procedures, a considerable well shut-in time is required from when the resin composition hardening process starts to when the particulate material is fully consolidated into a stationary permeable mass.

In accordance with the present invention, resin composition coated particulate material is very rapidly consolidated into a stationary permeable mass which significantly reduces the well shut-in time involved. More specifically, the time that a well must be shut-in before it can be placed on production as a result of waiting for hardenable resin composition coated particulate material to be consolidated is reduced by the methods of the present invention from more than a day to as little as several hours.

The improved methods of the present invention for consolidating particulate material in a subterranean zone penetrated by a well bore are basically comprised of the steps of coating the particulate material with a hardenable resin composition and then irradiating the hardenable resin composition coating on the particulate material with microwaves to thereby accelerate the hardening of the resin composition whereby the particulate material is rapidly consolidated into a stationary permeable mass.

When the particulate material to be consolidated is loose or incompetent formation sands, the sands are coated with a hardenable resin composition by pumping the hardenable resin composition into the subterranean zone containing the sands. When the particulate material to be consolidated is proppant material for propping fractures or gravel for forming gravel packs, the particulate material can be precoated with a hardenable resin composition at a location away from the job site, or the particulate material can be coated with a hardenable resin composition on the surface at the site or the particulate material can be coated while being pumped at the site. The hardenable resin composition is suspended in a fracturing or carrying fluid and the fracturing or carrying fluid is pumped into the subterranean zone to be fractured or gravel packed whereby the hardenable resin coated particulate material is deposited therein.

The irradiation of the hardenable resin composition with microwaves is accomplished in accordance with the present invention by lowering or otherwise transporting a source of microwaves, e.g., an electronic microwave generator, through the well bore into the subterranean zone, and then causing microwaves to be radiated from the source whereby the hardenable resin composition in the subterranean zone is irradiated with the microwaves. As will be further described hereinbelow, the simultaneous microwave irradiation of a gelled fracturing or carrying fluid in the subterranean zone accelerates the breaking of the gelled fluid whereby it rapidly reverts to a thin fluid.

A variety of particulate materials can be utilized as the gravel used in forming gravel packs and as the proppant material used in fracture stimulation procedures including sand, bauxite, ceramic materials, glass materials and the like. Typically, sand is utilized for both gravel packing and fracturing procedures having a particle size in the range of from about 2 to about 400 mesh, U.S. Sieve Series. The sand preferably has a particle size in the range of from 10 to about 70 mesh, U.S. Sieve Series, and has a particle size distribution range of one or more of 10–20 mesh, 20–40 mesh, 40–60 mesh or 50–70 mesh, depending on the particular application involved.

The hardenable resin compositions which are useful in accordance with the present invention are well known to those skilled in the art and are generally comprised of a hardenable organic resin, and when the particulate material to be coated is sand, a resin-to-sand coupling agent. Resin compositions which can be used to precoat sand prior to placing the resin coated sand in a formation or gravel pack are described, for example, in U.S. Pat. No. 4,074,760 issued to Copeland, et al. on Feb. 21, 1978 and U.S. Pat. No. 4,199,484 issued to Murphey on Apr. 22, 1980, both of which are incorporated herein by reference. Resin compositions suitable for "on-the-fly" coating are described in U.S. Pat. No. 4,042,032 issued to Anderson, et al. on Aug. 16, 1977, U.S. Pat. No. 4,070,865 issued to McLaughlin on Jan. 31, 1978, and U.S. Pat. No. 5,058,676 issued to Fitzpatrick, et al. on Oct. 22, 1991, all of which are incorporated herein by reference. The hardenable organic resin compositions are cured or hardened by heating to a temperature above about 150° F. and/or by contact with a hardening agent. Examples of hardenable organic resins which are particularly suitable for use in accordance with this invention are novolak resins, polyepoxide resins, polyester resins, phenol-aldehyde resins, urea-aldehyde resins, furan resins and urethane resins. The resins are available at various viscosities, depending upon the molecular weight of the resin. The preferred viscosity of the organic resin used in accordance with this invention is in the range of from about 1 to about 1,000 centipoises at 80° F. However, as will be understood, resins of higher viscosities can be utilized when mixed or blended with 1 or more diluents. Examples of suitable diluents for polyepoxide resins are styrene oxide, octylene oxide, furfuryl alcohol, phenols, furfural, liquid monoepoxides such as allyl glycidyl ether, and liquid diepoxides such as diglycidyl ether or resorcinol. Examples of such diluents for furfuryl alcohol resins, phenol-aldehyde resins and urea-aldehyde resins include, but are not limited to, furfuryl alcohol, furfural, phenol and cresol. Diluents which are generally useful with all of the various resins mentioned above are phenols, formaldehydes, furfuryl alcohol and furfural.

As mentioned, a coupling agent is utilized in the hardenable resin compositions to provide coupling or adhesion to sand and other silicious materials. A particularly suitable such coupling agent is an aminosilane compound or a mixture of such compounds selected from the group consisting of N-β-(aminoethyl)-γ-aminopropyltrimethoxysilane, N-β-aminoethyl)-N-β-(aminoethyl)-γ-aminopropyltrimethoxysilane, N-β-(aminopropyl)-N-β-(aminobutyl)-γ-aminopropyltriethoxysilane and N-β-(aminopropyl)-γ-aminopropyltriethoxysilane. The most preferred coupling agent is N-β-(aminoethyl)-γ-aminopropyltri-methoxysilane.

As also mentioned, the hardenable resin compositions described above will harden over time by heating in the formation to temperatures above about 150° F. However, to insure that the hardenable resin composition used in accordance with this invention hardens very rapidly, an internal hardening agent is preferably included in the resin composition. The internal hardening agent is selected whereby it causes the resin composition to begin hardening after a period of time sufficient for the resin composition to be pumped into a subterranean zone. A retarder or accelerator to lengthen or shorten the pumping time can be utilized with the hardening agent used.

Suitable internal hardening agents for resin compositions formed of polyepoxide resins include, but are not limited to, amines, polyamines, amides and polyamides. A liquid eutectic mixture of amines and methylene dianiline diluted with methyl alcohol can also be utilized. Examples of internal hardening agents which can be used with resin compositions containing furan resins, phenol-aldehyde resins, urea-aldehyde resins and the like are hexachloroacetone, 1,1,3-trichlorotrifluoroacetone, benzotrichloroide, benzylchloroide and benzalchloroide.

When a particulate material such as sand, bauxite or ceramic material is coated with a hardenable resin composition and suspended in a fracturing fluid or carrying fluid, various techniques can be utilized. For example, as mentioned above the particulate material can be precoated with a hardenable resin composition at a location remote from the job site and shipped to the site for use. Alternatively, the particulate material can be coated on the surface at the job site using conventional techniques and then suspended in the fracturing or carrying fluid to be utilized. In an alternate technique, the particulate material can be suspended in the gelled fluid with the hardenable resin composition being injected into the fluid as the fluid containing the suspended proppant is pumped, i.e., the resin composition can be injected on-the-fly in accordance with the methods described in U.S. Pat. No. 4,829,100 issued on May 9, 1989 to Murphey, et al. or U.S. Pat. No. 5,128,390 issued on Jul. 7, 1992 to Murphey, et al., both of which are incorporated herein by reference.

The gelled fracturing fluids or gelled carrying fluids which are useful in accordance with the present invention are also well known to those skilled in the art and are generally comprised of an aqueous liquid such as fresh water or salt water combined with a hydratable gelling agent. When the gelling agent hydrates in water, the viscosity of the mixture increases. The viscosity can be further increased by combining a cross-linking agent with the mixture. The increased viscosity reduces fluid loss and allows the fracturing or carrying fluid to transport significant quantities of hardenable resin coated particulate material into a subterranean zone and/or fractures created therein.

A variety of gelling agents can be utilized including hydratable polymers which contain one or more functional group such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. Hydratable synthetic polymers and co-polymers which contain the above mentioned functional groups and which have been utilized heretofore include polyacrylate, polymethacrylate, polyacrylamide, maleic anhydride, methylvinyl ether polymers, polyvinyl polymers, polyvinylpyrrolidone and xanthan gum.

Preferred hydratable polymers which yield high viscosities upon hydration, i.e., apparent viscosities in the range of from about 10 centipoises to about 90 centipoises at concentrations in the range of from about 10 pounds per 1,000 gallons to about 80 pounds per 1,000 gallons in water, are guar gum and guar derivatives such as hydroxypropylguar and carboxymethylguar, cellulose derivatives such as hydroxyethylcellulose, carboxymethylcellulose and carboxymethylhydroxyethylcellulose, polyacrylate, polymethacrylate, polyvinyl polymers and xanthan gum.

The viscosity of gelled fluids of the type described above can be increased by combining cross-linking agents with the gelled solutions. Examples of cross-linking agents which can be utilized include borates, multivalent metal salts, and other compounds which are capable of releasing multivalent metal ions in an aqueous solution. Examples of such multivalent metal ions are chromium, zirconium, antimony, titanium, iron (ferrous or ferric), and aluminum. The above described gelled or gelled and cross-linked fracturing or carrying fluids can also include internal gel breakers which are known to those skilled in the art such as those of the enzyme type, the oxidizing type or the acid buffer type. The gel breaker's function to cause a viscous gelled fluid to revert to a thin fluid after a period of time so that they can be produced back to the surface after they have served their purpose.

As mentioned above, in fracture stimulation procedures carried out in subterranean producing zones, a hardenable resin composition coated particulate proppant material, e.g. graded sand, is suspended in a viscous gelled fracturing fluid so that the coated proppant is carried into the formed fractures and deposited therein when the flow rate of the fracturing fluid and the pressure exerted on the fractured subterranean zone are reduced. The proppant functions to prevent the fractures from closing due to over burden pressures, i.e., to maintain the fractures in an open position whereby produced fluids can flow through the fractures.

In accordance with the methods of the present invention, a subterranean zone penetrated by a well bore is fractured by first suspending a particulate proppant material coated with a hardenable resin composition in a gelled fracturing fluid, then pumping the gelled fracturing fluid by way of the well bore into the subterranean zone at a rate and pressure sufficient to fracture the zone and carry the coated particulate proppant material into the fracture or fractures formed in the zone and next irradiating the gelled fracturing fluid and the hardenable resin composition coated proppant material with microwaves to thereby cause the acceleration of the breaking of the gelled fracturing fluid and the hardening of the resin composition coating on the proppant material whereby the fracturing fluid rapidly reverts to a thin fluid and the resin coated particulate proppant material is rapidly consolidated into a stationary permeable mass in the subterranean zone. Thereafter, fluids are produced from the subterranean zone.

Also, in accordance with this invention, a gravel pack is formed in a well bore penetrating a subterranean formation by suspending a particulate material coated with a hardenable resin composition in a carrying fluid, pumping the carrying fluid and resin composition coated particulate material into the annulus between a sand screen and the walls of the well bore whereby the resin coated particulate material is deposited in the annulus and then irradiating the resin coated particulate material with microwaves to thereby cause the acceleration of the hardening of the resin composition on the particulate material. As mentioned above, the carrying fluid can be a gelled fluid or it can be water pumped at a high rate to maintain the particulate material in suspension until it is deposited in the annulus.

In order to further illustrate the methods of the present invention, the following example is given.

EXAMPLE

Plugs formed of a variety of particulate materials were prepared in glass tubes. The plugs were about one inch in diameter by about two inches long. The particulate materials making up the plugs were coated with various hardenable resin compositions and the glass tubes containing the plugs were filled with various fluids simulating fracturing or carrying fluids.

The glass tubes containing the particulate material plugs and fluids were placed in a microwave oven having a maximum power of 650 watts and were exposed to 20 percent of the maximum power for about 40 minutes. The results of these tests are given in the Table below.

TABLE

CONSOLIDATION TESTS

| Particulate Material | Size of Particulate Material, U.S. Sieve Series Mesh Range | Hardenable Resin Composition | Fracturing or Carrying Fluid | Observations |
|---|---|---|---|---|
| Sintered Bauxite | 18–30 | Phenolic Resin[1] | Cross-linked aqueous hydroxypropylguar gel (40#/1000 gal)[2] | Strongly consolidated - Gel broken |
| Ceramic Material | 20–40 | Phenolic Resin[1] | Aqueous solution containing 2% by weight KCl | Strongly consolidated |
| Celfort Sand | 20–40 | Phenolic Resin[3] | Aqueous solution containing 2% by weight KCl | Strongly consolidated |
| Ottawa Sand | 20–40 | Phenolic Resin[4] | Aqueous solution containing 2% by weight KCl | Strongly consolidated |
| Ottawa Sand | 20–40 | Phenolic Resin[5] | Aqueous solution containing 2% by weight KCl | Strongly consolidated |
| Sintered Bauxite | 16–30 | Furan Resin[6] | Aqueous solution containing 2% by weight KCl | Strongly consolidated |
| Ottawa Sand | 20–40 | Furan Resin[7] | Aqueous solution containing 2% by weight KCl | Strongly consolidated |
| Ottawa Sand | 16–30 | Epoxy Resin[8] | Aqueous solution containing 2% by weight KCl | Strongly consolidated |

[1] Commercially available from Hepworth Minerals & Chemicals, Ltd. under the trade designation "NORCOTE PRIMA ™"
[2] Cross-linked with delayed borate cross-linker at pH of 11.5.
[3] Commercially available from Hepworth Minerals & Chemicals, Ltd. under the trade designation "NORCOTE SRDC with DOP ™" (shear resistant double coat with drill out preventor).
[4] Commercially available from Hepworth Minerals & Chemicals, Ltd. under the trade designation "SANTROL SUPER DC ™" (double coat).
[5] Commercially available from Borden Chemical, Inc., Oil Field Products Division, under the trade designation "SB ULTRA ™".
[6] Commercially available from Borden Chemical, Inc., Oil Field Products Division, under the trade designation "PRB ™" (precured resin).
[7] Commercially available from Halliburton Energy Services, Inc. under the trade designation "HYDROFIX ™". The resin was coated on-the-fly.
[8] Commercially available from Halliburton Energy Services, Inc. under the trade designation "PROPLOK 33 ™".

From the results of the tests given in the Table, it can be seen that the resin coated particulate materials tested were quickly consolidated as a result of microwave irradiation.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. An improved method of consolidating particulate material in a subterranean zone penetrated by a well bore comprising the steps of:

(a) coating said particulate material with a hardenable resin composition; and (b) irradiating said hardenable resin composition coating on said particulate material with microwaves to thereby accelerate the hardening of said resin composition whereby said particulate material is rapidly consolidated into a stationary permeable mass.

2. The method of claim 1 wherein said particulate material is coated in accordance with step (a) by pumping said hardenable resin composition through said well bore into said subterranean zone and into contact with said particulate material therein.

3. The method of claim 1 wherein said particulate material is coated in accordance with step (a) by being precoated away from the site of said well bore, by being coated on the surface at the site of said well bore or while being pumped at the site of said well bore and then placed into said subterranean zone prior to carrying out step (b).

4. The method of claim 1 wherein said hardenable composition is irradiated in accordance with step (b) by positioning a source of said microwaves in said subterranean zone and causing said microwaves to radiate from said source.

5. The method of claim 1 wherein said particulate material is selected from the group consisting of sand, bauxite and ceramic material.

6. The method of claim 1 wherein said hardenable resin composition is comprised of a hardenable organic resin.

7. The method of claim 6 wherein said hardenable organic resin is selected from the group of novolak resins, polyepoxide resins, polyester resins, phenol-aldehyde resins, urea-aldehyde resins, furan resins and urethane resins.

8. The method of claim 6 wherein said particulate material is sand and said hardenable resin composition further comprises an aminosilane coupling agent.

9. An improved method of forming a gravel pack in a subterranean zone penetrated by a well bore comprising the steps of:

(a) pumping a carrying fluid having a particulate material coated with a hardenable resin composition suspended therein by way of said well bore into said subterranean zone whereby said resin composition coated particulate material is deposited between a sand screen and the walls of said well bore in said subterranean zone;

(b) irradiating said hardenable resin composition coating on said particulate material with microwaves to thereby cause the acceleration of the hardening of said resin composition coating whereby said particulate material is rapidly consolidated into a stationary permeable mass; and (c) producing fluids from said subterranean zone.

10. The method of claim 9 wherein said particulate material is selected from the group consisting of sand, bauxite and ceramic material.

11. The method of claim 9 wherein said hardenable resin composition is comprised of a hardenable organic resin.

12. The method of claim 11 wherein said hardenable organic resin is selected from the group of novolak resins, polyepoxide resins, polyester resins, phenol-aldehyde resins, urea-aldehyde resins, furan resins and urethane resins.

13. The method of claim 11 wherein said particulate material is sand and said hardenable resin composition further comprises an aminosilane coupling agent.

14. The method of claim 9 wherein said carrying fluid is comprised of water.

15. The method of claim 9 wherein said carrying fluid is comprised of water and a hydratable gelling agent.

16. The method of claim 15 wherein said hydratable gelling agent is selected from the group of guar gum and derivatives thereof, cellulose derivatives, polyacrylate, polymethacrylate, polyvinyl polymers and xanthan gum.

17. The method of claim 15 wherein said carrying fluid further comprises a cross-linking agent.

18. The method of claim 17 wherein said cross-linking agent is selected from the group consisting of borates and compounds capable of releasing multivalent metal ions.

19. An improved method of fracturing a subterranean zone penetrated by a well bore comprising the steps of:

(a) suspending a particulate proppant material coated with a hardenable resin composition in a gelled fracturing fluid;

(b) pumping said gelled fracturing fluid of step (a) by way of said well bore into said subterranean zone at a rate and pressure sufficient to fracture said zone and carry said particulate proppant material coated with said hardenable resin composition into the fracture or fractures formed in said zone;

(c) irradiating said gelled fracturing fluid and said hardenable resin composition coating on said proppant material with microwaves to thereby cause the acceleration of the breaking of said gelled fracturing fluid whereby it rapidly reverts to a thin fluid and the hardening of said resin composition coating whereby said particulate proppant material is rapidly consolidated into a stationary permeable mass; and then (d) producing fluids from said subterranean zone.

20. The method of claim 19 wherein said particulate proppant material is selected from the group consisting of sand, bauxite and ceramic material.

21. The method of claim 19 wherein said particulate propping material is sand and said hardenable resin composition is comprised of a hardenable organic resin and a coupling agent.

22. The method of claim 21 wherein said hardenable organic resin is selected from the group of novolak resins, polyepoxide resins, polyester resins, phenol-aldehyde resins, urea-aldehyde resins, furan resins and urethane resins.

23. The method of claim 21 wherein said coupling agent comprises an aminosilane compound.

24. The method of claim 19 wherein said gelled fracturing fluid is comprised of water and a hydratable gelling agent.

25. The method of claim 24 wherein said hydratable gelling agent is selected from the group of guar gum and derivatives thereof, cellulose derivatives, polyacrylate, polymethacrylate, polyvinyl polymers and xanthan gum.

26. The method of claim 24 wherein said gelled fracturing fluid further comprises a cross-linking agent.

27. The method of claim 26 wherein said cross-linking agent is selected from the group consisting of borates and compounds capable of releasing multivalent metal ions.

* * * * *